(12) United States Patent
Stahlhut et al.

(10) Patent No.: US 7,336,000 B2
(45) Date of Patent: Feb. 26, 2008

(54) ELECTRICAL POWER REGULATION FOR A TURBOGENERATOR AND GENERATOR ASSOCIATED WITH AN INTERNAL COMBUSTION ENGINE

(75) Inventors: Ronnie Dean Stahlhut, Bettendorf, IA (US); Carl Thomas Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/409,375

(22) Filed: Apr. 20, 2006

(65) Prior Publication Data
US 2007/0246942 A1 Oct. 25, 2007

(51) Int. Cl.
*F02C 9/30* (2006.01)
*F02D 29/06* (2006.01)

(52) U.S. Cl. .......... 290/52; 290/40 C; 322/29
(58) Field of Classification Search .......... 290/7, 290/40 R, 40 C, 51, 52; 60/772, 804, 773; 322/28, 29
See application file for complete search history.

(56) References Cited

U.S. PATENT DOCUMENTS

| | | | | |
|---|---|---|---|---|
| 4,665,704 | A | 5/1987 | Hartwig | 60/597 |
| 4,955,199 | A | 9/1990 | Kawamura | 60/608 |
| 5,176,000 | A | 1/1993 | Dauksis | 60/618 |
| 5,893,423 | A | 4/1999 | Selfors et al. | 180/65.2 |
| 5,932,940 | A | 8/1999 | Epstein et al. | 310/40 MM |
| 6,012,289 | A | 1/2000 | Deckard et al. | 60/602 |
| 6,093,975 | A * | 7/2000 | Peticolas | 290/52 |
| 6,125,625 | A * | 10/2000 | Lipinski et al. | 60/801 |
| 6,169,334 | B1 * | 1/2001 | Edelman | 290/52 |
| 6,213,234 | B1 | 4/2001 | Rosen et al. | 180/65.3 |
| 6,281,595 | B1 | 4/2001 | Sinha et al. | 290/40 A |
| 6,294,842 | B1 * | 9/2001 | Skowronski | 290/7 |
| 6,308,639 | B1 | 10/2001 | Donnelly et al. | 105/50 |
| 6,604,360 | B1 | 8/2003 | Vuk | 60/597 |
| 6,606,864 | B2 * | 8/2003 | MacKay | 60/773 |
| 6,683,389 | B2 * | 1/2004 | Geis | 290/40 C |
| 6,703,719 | B1 | 3/2004 | McConnell | 290/52 |
| 6,870,279 | B2 * | 3/2005 | Gilbreth et al. | 290/52 |
| 2002/0003053 | A1 | 1/2002 | Geisse et al. | |
| 2004/0200215 | A1 | 10/2004 | Woollenweber et al. | |
| 2005/0155349 | A1 | 7/2005 | Sugiura et al. | |

FOREIGN PATENT DOCUMENTS

DE 19600252 7/1997
EP 1083319 3/2001

OTHER PUBLICATIONS

European Search Report dated Sep. 19, 2007.

* cited by examiner

*Primary Examiner*—Nicholas Ponomarenko (57) ABSTRACT

A speed monitor for establishing a lower threshold and an upper threshold for a speed of a rotor or shaft of a turbogenerator. A speed detector detects speed data or a speed signal for a rotor or shaft associated with a turbogenerator. A turbogenerator controller controls an output current of the turbogenerator based on the detected speed data or speed signal to control a rotational speed of the rotor or the shaft. A voltage monitor establishes a lower voltage limit and an upper voltage limit for a generator. A voltage detector detects an output voltage level associated with the generator. A motor/generator controller controls the output voltage level of the generator electrical output by invoking at least one of a motor mode and a generator mode based on the detected output voltage level to maintain a desired operational voltage range.

23 Claims, 6 Drawing Sheets

ELECTRICAL POWER REGULATION FOR A TURBOGENERATOR AND GENERATOR ASSOCIATED WITH AN INTERNAL COMBUSTION ENGINE

FIELD OF THE INVENTION

The present invention relates to electrical power regulation for a turbogenerator and a generator associated with an internal combustion engine.

BACKGROUND OF THE INVENTION

A turbogenerator may comprise a turbine that is mechanically coupled to a primary generator. A rotor (e.g., turbine blade) associated with the turbine or the primary generator may have a rotational speed in response to the flow of exhaust gas of an internal combustion engine. The engine is arranged to provide rotational energy to a secondary generator or motor/generator. There is a need to control a first electrical output of the turbogenerator and a second output of the motor/generator, such that the first electrical output and the second electrical output, or both provide reliable regulated electrical output to a load.

SUMMARY OF THE INVENTION

A system and method for electrical power regulation of a turbogenerator and a generator associated with an internal combustion engine comprises a speed monitor for establishing a lower threshold speed and an upper threshold speed for a speed of a rotor or shaft of the turbogenerator. A speed detector detects speed data or a speed signal for a rotor or shaft associated with a turbogenerator. A turbogenerator controller controls an output current associated with the turbogenerator based on the detected speed data or speed signal to control a rotational speed of the rotor or the shaft. A voltage monitor establishes a lower voltage limit and an upper voltage limit for a generator or an output bus. A voltage detector detects an output voltage level associated with the generator. A motor/generator controller controls the output voltage level associated with the generator electrical output by invoking at least one of a motor mode and a generator mode based on the detected output voltage level to maintain a desired operational voltage range at the output bus. The motor mode may be associated with multiple levels of propulsion intensity and the generator mode may be associated with multiple levels of power generation intensity.

DESCRIPTION OF THE PREFERRED EMBODIMENT

Figure 1:
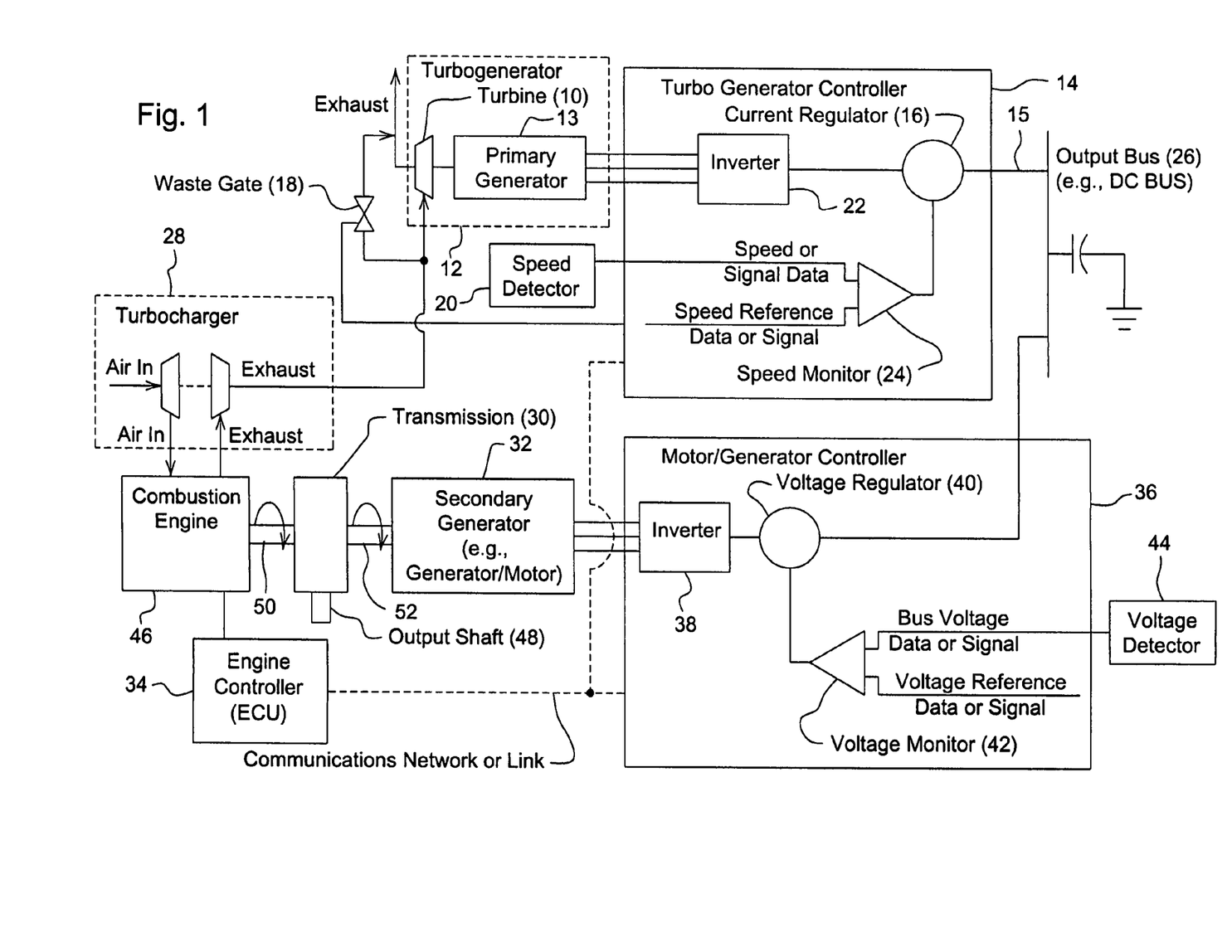
FIG. 1 is a block diagram of one embodiment of a system for electrical power regulation for a turbogenerator and a generator associated with an internal combustion engine.

In FIG. 1, an internal combustion engine 46 produces exhaust gas and/or heat for driving a turbogenerator 12. The turbogenerator 12 comprises a turbine 10 that is arranged to drive a primary generator 13. The turbine 10 is placed in communication with exhaust gas or steam associated with the internal combustion engine 46. A turbogenerator electrical output of the primary generator 13 is coupled to a turbogenerator controller 14. In turn, a regulated current output 15 of the turbogenerator controller 14 is coupled to an output bus 26 (e.g., direct current bus). The output bus 26 may be used to provide electrical energy to one or more loads or an energy storage device (e.g., battery or ultracapacitor). A regulated voltage output of the motor/generator controller 36 is coupled to the output bus 26. A capacitor coupled to the output bus 26 may comprise an electrolytic capacitor or a similar capacitor to smooth ripples that might otherwise appear on the output bus 26.

The transmission 30 may be configured with a first input shaft 50, a second input shaft 52, and an output shaft 48. The transmission 30 may include a clutch and gear assembly for directing or applying rotational energy from one or more input shafts (50, 52) to the output shaft 48. The internal combustion engine 46 also provides an engine output shaft, which may be coupled to the first input shaft 50 of the transmission 30. For example, the transmission 30 may direct rotational energy from the internal combustion engine 46 to a load (e.g., drive wheel or track) associated with an output shaft 48, a secondary generator 32, or both. To the extent that mechanical energy is applied to the secondary generator 32, the secondary generator 32 provides a generator electrical output to a motor/generator controller 36.

In one embodiment, the secondary generator 32 comprises: (a) a motor or electric drive in a motor mode or propulsion mode and (b) a secondary generator 32 or alternator during a generator mode or power generation mode. As used herein, the propulsion mode is synonymous with the motor mode; power generation mode is synonymous with the generator mode. In the propulsion mode, the secondary generator 32 or motor is capable of rotating a motor output shaft, whereas in the power generation mode the secondary generator 32 converts mechanical rotational energy into electrical energy. It is understood by those of skill in the art that the terms "motor/generator", "generator", "secondary generator", "alternator" could be used generally interchangeably with "motor," without any loss of functionality, limitation of mode, or meaning with the caveat that "alternator" may appropriately refer to alternating current (AC) configurations.

Referring to FIG. 1 in greater detail with respect to a current control loop of the turbogenerator controller 14, a speed detector 20 is associated with a rotor or shaft of the primary generator 13 or the turbine 10. The speed detector 20 provides a sensor signal, speed data or sensor data to a speed monitor 24. The speed detector 20 may comprise an electromagnetic speed sensor, a Hall effect speed sensor, an optical speed sensor, a mechanical speed sensor, or another suitable speed sensor that measures a rotational speed, velocity, or number of revolutions of the shaft or rotor. In one illustrative configuration, the speed detector 20 may monitor a number of voltage pulses per unit time associated with the back electromotive force (EMF) produced in the windings of the primary generator 13 to infer or estimate the rotational speed of the shaft, rotor, turbine 10, or turbine blades. In another illustrative configuration, a speed detector 20 may include a magnetic element (e.g., magnet) arranged for rotation with the rotor or shaft of the turbogenerator 12 and a stationary sensing coil mounted in proximity to the magnetic element to detect changes the current (or voltage) that facilitate measurement of the rotational speed of the shaft or rotor. Further, the speed detector 20 may include a timer or clock for determining the number of revolutions per time unit (i.e., the rotational speed of the shaft or the rotor of the turbogenerator 12).

In one configuration, the turbogenerator controller 14 may comprise an inverter 22, a speed monitor 24, and a current regulator 16. The inverter 22 may comprise a rectifier or switching circuit that converts an input alternating current waveform into an output direct current voltage.

The speed monitor 24 supports monitoring of the speed or range of speed of the rotor or shaft of the primary generator 13 or the turbine 10. The speed monitor 24 may receive speed data or a speed signal from the speed detector 20. A reference source or user may input, provide or program speed reference data or a signal into the speed monitor 24 to facilitate comparison to the received speed data or speed signal.

The speed monitor 24 may comprise a comparator, a microcontroller, a logic unit or another data processor. The speed monitor may store speed reference data or a speed signal that indicates a desired rotor/shaft speed or desired speed range for operation of the turbogenerator 12 (e.g., the turbine 10 or the primary generator 13). In one embodiment, the desired speed may be determined by how efficiently and reliably the turbogenerator 12 operates at a corresponding desired speed to generate a suitable electrical energy signal (e.g., alternating current waveform) of sufficient voltage amplitude and current level for the load (e.g., predominately resistive load) on the output bus 26.

The current regulator 16 outputs a current output (derived from the turbogenerator 12) that is generally independent of a voltage level on the output bus 26 (e.g., DC bus). The voltage level of the output current is determined by a load impedance on the output bus 26 or a parallel combination of the output impedance of the voltage regulator 40 and the load impedance on the output bus 26.

With respect to a voltage control loop of the motor/generator controller 36 of FIG. 1, the voltage detector 44 detects the voltage level (e.g., direct current voltage level) associated with the output bus 26 (e.g., DC bus). The voltage detector 44 may comprise a resistive divider or ladder to scale down the voltage level from the output bus 26 to a suitable voltage for an analog-to-digital (A/D) converter of the voltage detector 44.

In one embodiment, the motor/generator controller 36 may comprise an inverter 38, a voltage monitor 42, and a voltage regulator 40. The inverter 38 may support a propulsion mode (i.e., motor mode) and a power generation mode (i.e., generator mode) of the secondary generator 32, or the generator/motor. In the propulsion mode, the inverter 38 communicates a control signal (e.g., variable frequency or variable pulse width modulated signal) to the secondary generator 32 (which may also be referred to as a generator/motor) or rectifies an electrical output of the secondary generator 32. The inverter 38 may comprise one or more semiconductors arranged in a switch mode configuration. The inverter 38 may chop or process the direct current (DC) signal on the output bus 26 to output an alternating current (AC) output signal suitable for the secondary generator 32 as a motor in the propulsion mode. In one example, the inverter 38 provides a variable frequency drive signal with one or more phases for the motor. In another example, the inverter 38 supports the pulse-width modulation of the inputted DC signal to produce the AC output signal for driving the motor. The frequency or pulse width of the pulse width modulation signal may be varied to control a speed of the motor. In the power generation mode, the inverter 38 may act as a rectifier or may otherwise process an alternating current signal to form a direct current signal.

The voltage monitor 42 may comprise a comparator, a microcontroller, a logic unit, a programmable logic device, a digital signal processor, or another data processor. The voltage monitor 42 may establish and facilitate adherence to one or more of the following: a desired operational voltage range, a desired voltage level, a voltage operating point, a minimum voltage level, a maximum voltage level, and a target voltage range of the output bus 26. The voltage monitor 42 may establish or define an operational voltage range for an output bus 26 or another suitable measurement point. The user or a reference source may input, provide or program a voltage reference data or signal into the voltage monitor 42 that is indicative of a desired operational voltage range (e.g., for the output data bus 26). The voltage monitor 42 may receive voltage data or a voltage signal from the voltage detector 44 to facilitate comparison to the received voltage data or voltage signal.

The voltage regulator 40 may support the propulsion mode (i.e., motor mode) and a power generation mode (i.e., generator mode) of the secondary generator 32. For the propulsion mode, the voltage regulator 40 may facilitate the provision of reliable, controlled electrical energy from the output bus 26 to the inverter 38 or the secondary generator 32, as a motor. For the power generation mode, the voltage regulator 40 regulates the direct current voltage level associated with the output bus 26 (e.g., DC bus) for an electrical signal flowing from the secondary generator 32 to the output bus 26. Further, the voltage regulator 40 outputs a generally constant output voltage or output voltage range for the output bus 26, for a respective defined operational current range.

In one embodiment, both the propulsion mode and the power generation mode are supported as follows: The voltage regulator 40 regulates the direct current voltage level associated with the output bus 26 for an electrical signal flowing from the secondary generator 32 to the output bus 26 in the power generation mode; and the voltage regulator 40 regulates an input/output port voltage level of the inverter 38 for an electrical signal flowing from the output bus 26 to the secondary generator 32 via the inverter 38. Accordingly, the voltage regulator 40 may comprise a bidirectional voltage regulator, a unidirectional voltage regulator, or a unidirectional voltage regulator with a bypass electrical path that allows bidirectional flow of an electrical signal.

The voltage regulator 40 regulates the voltage level or voltage operating point associated with the output bus 26 based upon input from the voltage detector 44, the voltage monitor 42, or both. For example, the voltage regulator 40 may shunt a portion of the input voltage to ground through a resistance (of resistors or semiconductor components configured as resistors, or otherwise) if the voltage detector 44 determines that the direct current voltage level or voltage operating point of the output bus 26 exceeds a target voltage range or if the motor controller instructs the voltage level or voltage operating point to be decreased to manage the speed of a rotor or shaft associated with the turbogenerator 12. Because the system of FIG. 1 uses only a single voltage regulator 40, potential conflicts between multiple power sources (e.g., the primary generator 13 and the secondary generator 32) are avoided.

Although the embodiment of FIG. 1 includes a turbocharger 28 in series with the turbine 10 of the turbogenerator 12, in other embodiments the turbocharger 28 may be deleted.

In one embodiment, a waste gate 18 may be associated with the turbine 10 to prevent the turbine 10 from exceeding a maximum rotational speed. The turbogenerator controller 14 may send a control signal to the waste gate to open, close, or otherwise adjust the waste gate to attain one or more of the following objectives: to avoid exceeding a maximum rotational speed of the turbine 10 or turbogenerator 12, to improve or reduce the response time of the turbocharger 28, to improve engine responsiveness, and to lower certain exhaust emissions during transient operation of the internal combustion engine 46. Although the internal combustion engine 46 may be run at target or target range of revolutions per unit time (e.g., 1,800 to 2,200 revolutions per minute) of a shaft (e.g., crankshaft) for efficient operation, the internal combustion engine 46 may be run at virtually any revolutions per unit time within its operational range. An engine controller 34 (ECU) may control the revolutions per unit time of a crankshaft or output shaft 48 of the internal combustion engine 46.

A fuel delivery system (e.g., fuel injection system or carburetion system) may be associated with a controller (e.g., regulator) for metering or otherwise regulating the flow of fuel to maintain the target or target range of revolutions per unit time, for example. The turbine 10 is mechanically coupled to a primary generator 32 (e.g., alternator) that generates electrical energy that may be used by one or more components of the vehicle. The voltage level output of the turbogenerator 12 is generally directly proportional to the rotational speed of the shaft or rotor of the turbogenerator 12.

In one embodiment, the system and method controls a rotational speed of a rotor or shaft of the turbogenerator 12 in accordance with an actual speed of the rotor or shaft. The speed monitor 24 or another data processor establishes a lower threshold speed and a higher threshold speed for a speed of a rotor or shaft of a turbogenerator 12. The lower threshold speed and the higher threshold speed define the desired speed range for operation of the turbogenerator 12. The lower threshold and higher threshold may be programmed into the monitor as a factory setting for the particular turbogenerator 12, for example. The speed detector 20 determines speed data or a speed signal for a rotor or shaft associated with a turbogenerator 12.

A current regulator 16 or turbogenerator controller 14 adjusts an output current level associated with the output bus 26 within a target current range if the speed data or speed signal indicates that the speed is above the higher threshold speed or below the lower threshold speed. The current regulator 16 outputs a current output (derived from the turbogenerator 12) that is generally independent of a voltage level on the output bus 26 (e.g., DC bus). If the speed data or signal indicates a speed below a lower threshold speed, the current regulator 16 decreases a current level output associated with the current regulator 16 to adjust a speed of the rotor or shaft of the turbogenerator 12. However, if the speed data or signal indicates a speed above a higher threshold, the current regulator 16 increases the current level output associated with current regulator 16 to adjust the speed of the rotor or shaft of the turbogenerator 12.

In one embodiment, the primary generator 13 has one or more coils (e.g., windings) that are rotated by the turbine 10 in a rotational direction to produce an output current. As the shaft or rotor of the primary generator 13 is rotated in one rotational direction, a counter-torque opposes the rotational direction. The degree of counter-torque induced by generated current in the coils is generally proportional to the output current or load current of the primary generator 13. The current regulator 16 may affect the load current associated with a turbogenerator output of turbogenerator 12 by changing the current output associated with the output bus 26 or current regulator 16. As the current level output associated with the output bus 26 or the current regulator bus is increased, the counter-torque is increased; hence, the rotational speed of the rotor or shaft of the turbogenerator 12 is decreased. As the current level output associated with the output bus 26 is decreased, the counter-torque is decreased; hence, the rotational speed of the rotor or shaft of the turbogenerator 12 is increased.

Figure 2:
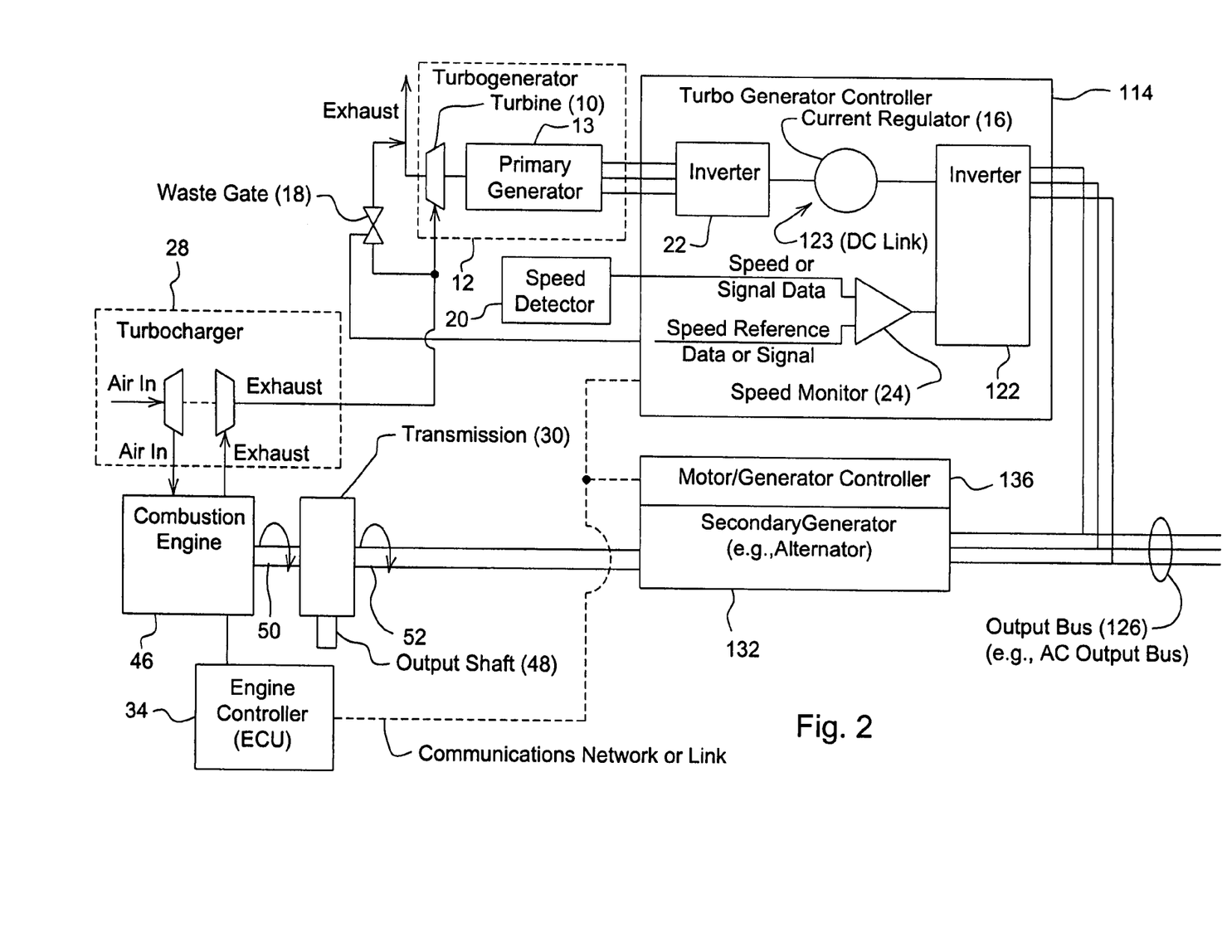
FIG. 2 is a block diagram of another embodiment of a system for electrical power regulation for a turbogenerator and a generator associated with an internal combustion engine.

The system of FIG. 2 is similar to the system of FIG. 1, except that the system of FIG. 2 replaces the motor/generator controller 36 and the secondary generator 32 with a generator controller 136 and a secondary current generator 132, respectively, and FIG. 2 replaces the turbogenerator controller 14 with the turbogenerator controller 114. Further, the system of FIG. 2 shows an alternating current bus as the output bus 126. Although the alternating current bus of FIG. 2 implies that it is a three-phase system as shown, any number of phases may be used. Like reference numbers in FIG. 1 and FIG. 2 indicate like elements.

Because the power generation system of FIG. 2 is designed for stationary operation, the transmission 30 may be omitted and replaced with a coupling (e.g., universal joint, pulley-belt system) or other device for transferring mechanical rotational energy between shafts (50, 52). The system of FIG. 2 is designed to provide stationary power to an alternating current (AC) power load and features efficient power output for a corresponding engine power class of the internal combustion engine 46.

The turbogenerator controller 144 comprises a speed monitor 24 and an inverter 22 coupled to another inverter 122 via a direct current link 123. The inverter 22 receives one or more input signals (alternating current signals) from the turbogenerator 12 and the inverter 22 outputs a direct current signal to a direct current link 123 or a current regulator 16 associated with the direct current link 123. The current regulator 16 regulates the output current of the turbogenerator 12 and controls the rotational speed of the primary generator 13 of the turbogenerator 12 in substantially the same manner as FIG. 1. Although the current regulation loop of FIG. 1 and FIG. 2 are substantially similar, the voltage control of FIG. 2 differs in that a voltage regulator of the generator controller 136 does not manage or control switching from the propulsion mode to the power generation mode, but rather remains in the power generation mode of the secondary generator 132. The secondary generator 132 may comprise an alternator. The regulated current output of the current regulator 16 feeds an input of another inverter 122, which inverts or processes the direct current signal into an alternating current signal for the output bus 126. The output bus 126 may be connected to an alternating current load, for example.

Figure 3:
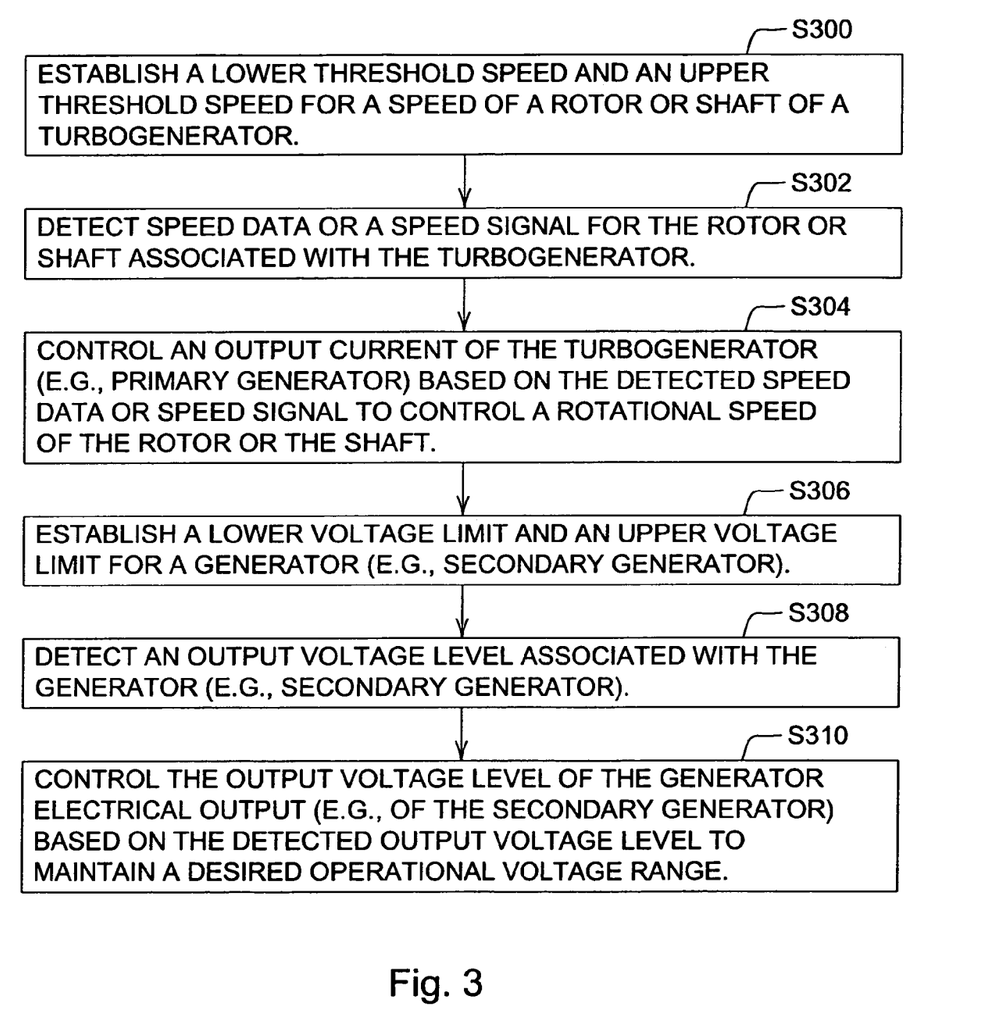
FIG. 3 is a flow chart of one embodiment of a method for electrical power regulation.

FIG. 3 is a flow chart of a method for electrical regulation of an internal combustion engine 46 associated with a turbogenerator 12. The method of FIG. 3 begins in step S300.

In step S300, a speed monitor 24 establishes a lower threshold speed and an upper threshold speed for a speed of a rotor or shaft of a turbogenerator 12. For example, the speed monitor 24 establishes a lower threshold speed and an upper threshold speed consistent with an optimum speed or speed range for gas (e.g., exhaust gas) flow conditions, given the specifications of the turbine 10. The specifications of the turbine 10 may include one or more of the following: the blade geometry or dimensions, turbine geometry or dimensions, or impeller geometry or dimensions, operational parameters, speed range parameters, maximum speed, flow rate parameters, bearing specifications, and thermal requirements of the turbine 10, and other technical parameters. The rotor may refer to the rotor of the primary generator 13 or the impeller or rotor of the turbine.

In step S302, a speed detector 20 detects speed data or a speed signal for a rotor or shaft associated with a turbogenerator 12.

In step S304, a turbogenerator controller 14 or current regulator 16 controls output current of the turbogenerator 12 (e.g., primary generator 13) based on the detected speed data or speed signal to control a rotational speed of the rotor or the shaft. Step S304 may be carried out in accordance with various techniques, which may be applied alternately and cumulatively. Under a first technique, a turbogenerator controller 14 or current regulator 16 controls an output current of the turbogenerator 12 by invoking at least one of a higher current level and a lower current level based on the detected speed data or speed signal to control a rotational speed of the rotor or the shaft. The current regulator 16 outputs a current output (derived from the turbogenerator 12) that is generally independent of a voltage level on the output bus 26 (e.g., DC bus).

Under a second technique, the turbogenerator controller 14 or current regulator 16 controls an output current to maximize turbogenerator output, while controlling turbine speed to operate the rotor of the turbine 10 at an optimum speed or speed range for gas (e.g., exhaust gas) flow conditions. By controlling turbine speed independent of speed of the internal combustion engine 46 and the load on the internal combustion engine 46, the turbogenerator output of the turbogenerator 12 may be optimized.

In step S306, a voltage monitor 42 establishes a lower voltage limit and an upper voltage limit for a generator (e.g., a secondary generator 32). The lower voltage limit and the upper voltage limit may be based upon acceptable operational voltage or tolerance of a load on the output bus 26, for example.

In one embodiment, the voltage monitor 42 may comprise one or more comparators. For example, a first comparator has a first input coupled to a voltage detection node and a second input coupled to a lower voltage level as a reference voltage; the second comparator has a first input coupled to the voltage detection node and a second input coupled to a higher voltage level as a reference voltage. The voltage detection node may comprise the output bus 26 or an output of the voltage detector 44.

In step S308, a voltage detector 44 detects an output voltage level associated with the generator (e.g., secondary generator 32).

In step S310, a motor/generator controller 36 controls the output voltage level of the generator electrical output (e.g., of the secondary generator 32) based on the detected output voltage level to maintain a desired operational voltage range. The secondary generator 32 may also be referred to as a generator/motor. The voltage regulator 40 outputs a generally constant output voltage or output voltage range for the output bus 26 or load associated therewith.

Step S310 may be carried out in accordance with various techniques, which may be applied alternately or cumulatively. Under a first technique, a motor/generator controller 36 controls the output voltage level of the generator electrical output of the secondary generator 32 by invoking at least one of a propulsion mode (i.e., motor mode) and a power generation mode (i.e., generator mode) based on the detected output voltage level to maintain a desired operational voltage range. In other words, the secondary generator 32 is used as a voltage regulating load and/or source to manage the power flow, while maintaining a desired operational voltage range.

Under a second technique, the motor mode may be associated with multiple levels of propulsion intensity and the generator mode may be associated with multiple levels of power generation intensity. Accordingly, the motor/generator controller 36 may vary the propulsion intensity level in the motor mode or the power generation intensity in the generator mode to maintain a desired operational voltage range.

Under a third technique, the motor/generator controller 36 may change a first duration or first duty cycle that the secondary generator 32 spends in the power generation mode, relative to a second duration or second duty cycle of the secondary generator 32 in the propulsion mode. The duty cycle of the propulsion mode may be defined in terms of a ratio or percentage of operation time in the propulsion mode versus all modes (e.g., the propulsion mode and power generation mode, collectively). The duty cycle of the power generation mode may be defined in terms of a ratio or percentage of operation time in the power generation mode versus all modes (e.g., the propulsion mode and power generation mode, collectively).

Figure 4:
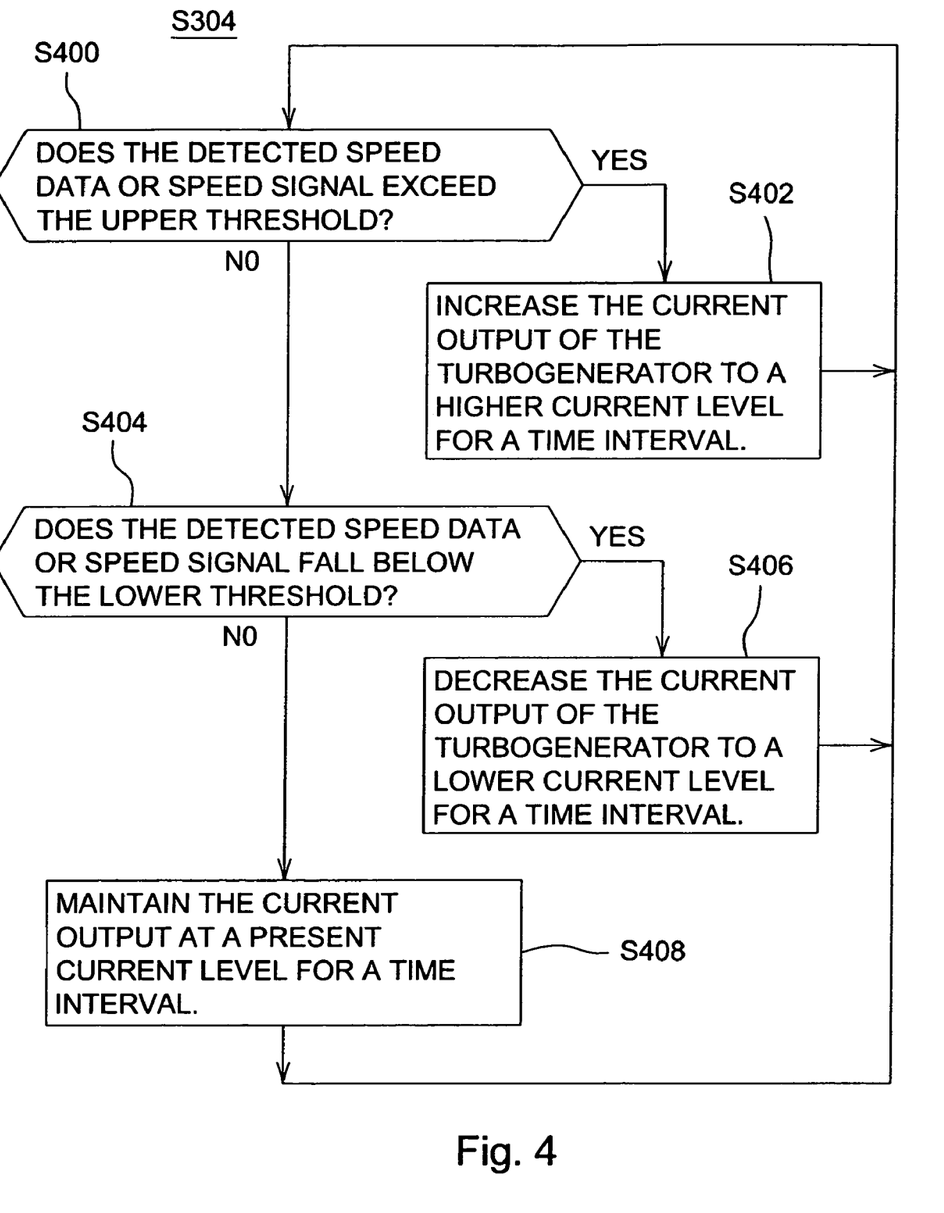
FIG. 4 is a flow chart of an illustrative procedure for controlling a speed of a turbine or turbogenerator, consistent with FIG. 3.

FIG. 4 is a flow chart of one embodiment of a method for controlling a speed of a turbine 10 or turbogenerator 12, consistent with FIG. 3. The method of FIG. 4 provides an illustrative procedure for carrying out step S304 of FIG. 3. The method of FIG. 4 may be referred to as a current control loop or a turbogenerator control loop. The method of FIG. 4 begins in step S400.

In step S400, a speed detector 20 determines if the detected speed data or speed signal exceeds the upper threshold. If the detected speed data or speed signal exceeds the upper threshold, the method continues with step S402. However, if the detected speed data or speed signal does not exceed the upper threshold, the method continues with step S404.

In step S402, the turbogenerator controller 14 or the current regulator 16 increases the current output of the turbogenerator 12 (or the primary generator 13) to a higher current level for a time interval.

In step S404, a speed detector 20 determines if the detected speed data or speed signal falls below the lower threshold. If the detected speed data or speed signal falls below the lower threshold, then the method continues with step S406. However, if the detected speed data or speed signal does not fall below the lower threshold, the method continues with step S408.

In step S406, the turbogenerator controller 14 or the current regulator 16 decreases the current output of the turbogenerator 12 (or the primary generator 13) to a lower current level for a time interval.

In step S408, the turbogenerator controller 14 or the current regulator 16 maintains the current output at a present current level for a time interval. After execution of steps S402, S406, or S408, the method may return to step S400 and continue thereafter until interrupted or halted (e.g., by the turbogenerator controller 14).

Figure 5:
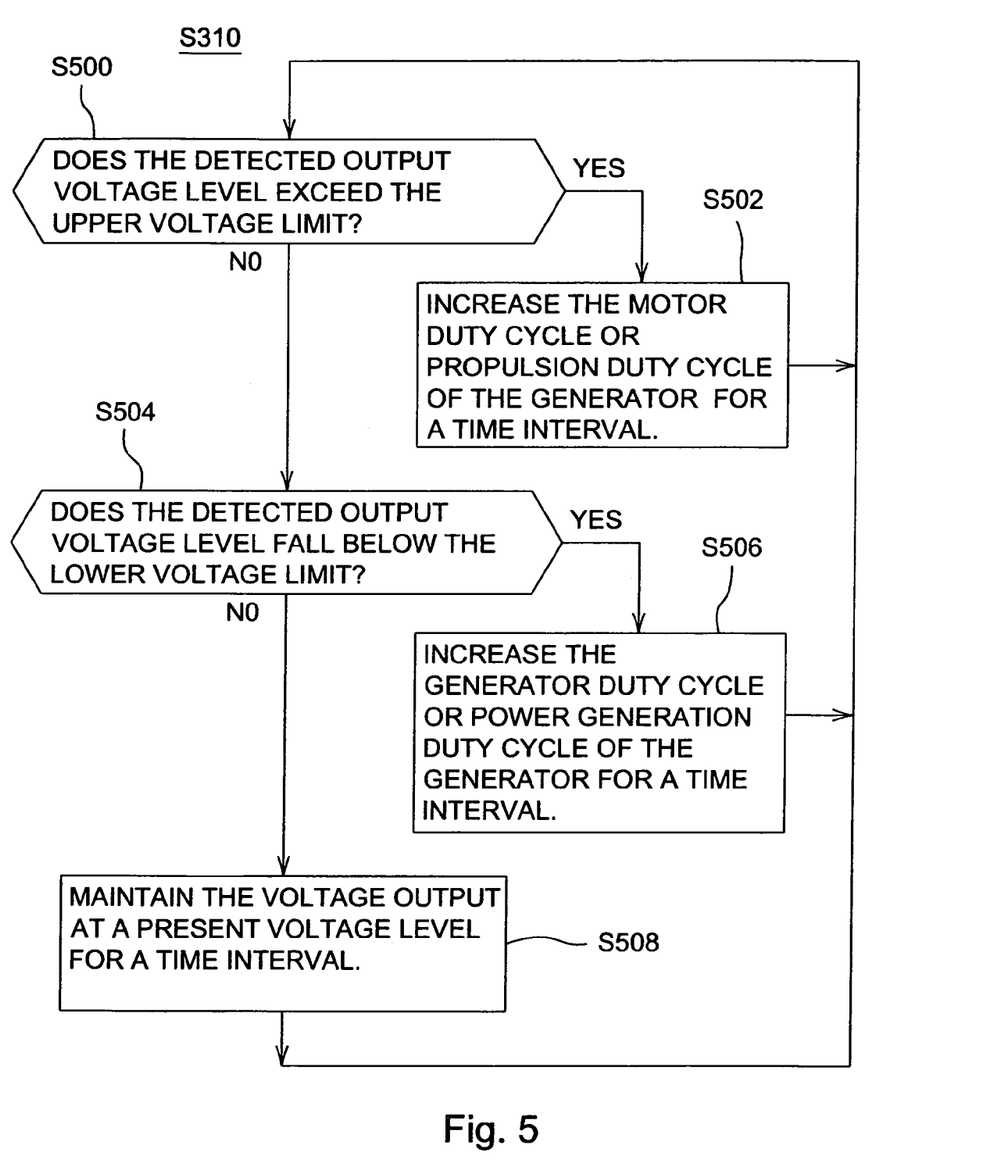
FIG. 5 is a flow chart of an illustrative procedure for controlling a voltage output of a generator, consistent with FIG. 3.

FIG. 5 is a flow chart of one embodiment of a method for controlling a voltage output of a generator, consistent with FIG. 3. The method of FIG. 5 provides an illustrative procedure for carrying out step S310 of FIG. 3. The method of FIG. 5 may be referred to as a voltage control loop or a generator control loop (e.g., applicable to the secondary generator 32). The method of FIG. 5 begins in step S500.

In step 500, a voltage detector 44 or the voltage monitor 42 determines whether or not the detected output voltage level (e.g., of an output bus 26) exceeds the upper voltage limit. If the detected output voltage level exceeds the upper voltage limit, the method continues with step S502. However, if the detected output voltage level does not exceed the upper voltage limit, the method continues with step S504.

In step S502, the motor/generator controller 36 or the voltage regulator 40 increases the propulsion duty cycle or motor duty cycle of the generator 32 for a time interval or increases an intensity level of the propulsion mode (i.e., motor mode) of the generator 32.

In step S504, a voltage detector 44 or voltage monitor 42 determines whether or not the detected output voltage level (e.g., of an output bus 26) falls below the lower voltage limit. If the detected output voltage level falls below the lower voltage limit, the method continues with step S506. However, if the detected output voltage level does not fall below the lower voltage limit, the method continues with step S508.

In step S506, the generator duty cycle or power generation duty cycle of the generator (e.g., 13) is increased for a time interval.

In step S508, the motor/generator controller 36 or the voltage regulator 40 maintains the voltage output at a present voltage level for a time interval.

Figure 6:
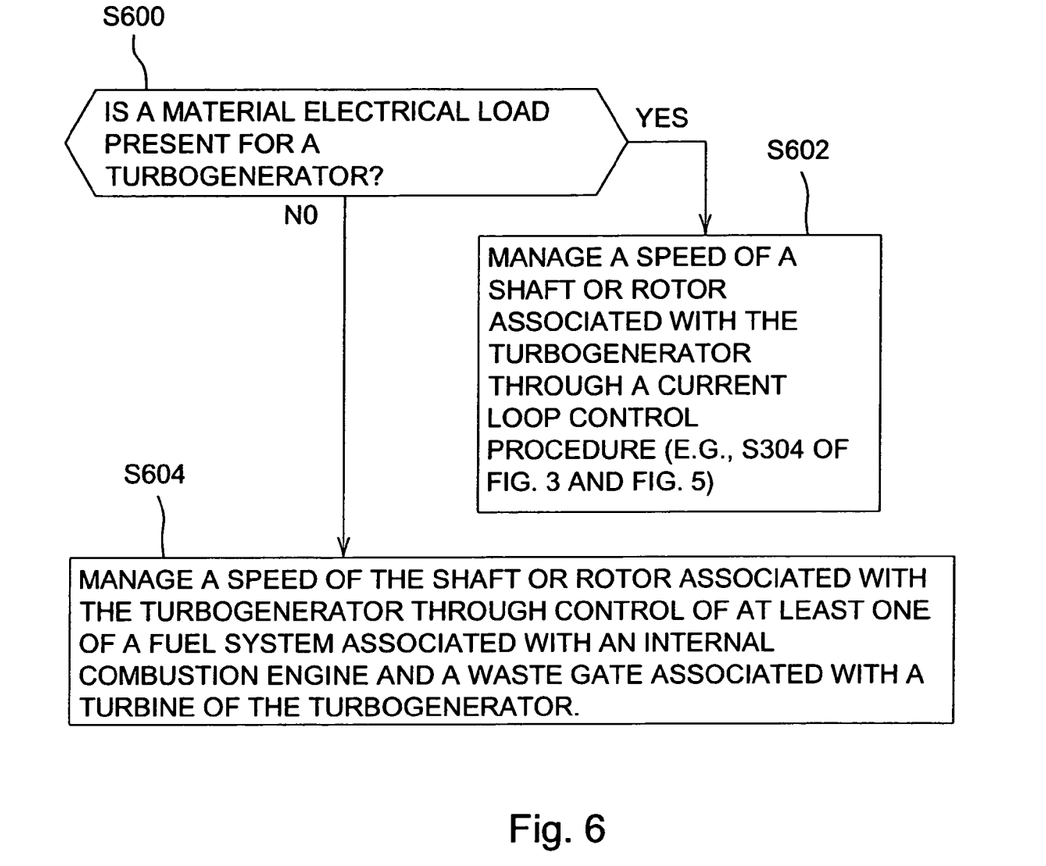
FIG. 6 is a flow chart of another embodiment of a method for electrical power regulation.

FIG. 6 is a method of controlling a turbogenerator. The method of FIG. 6 begins in step S600.

In step S600, a turbogenerator controller 14 or current regulator 16 determines whether a material electrical load is present for a turbogenerator 12. A material electrical load is a load that draws or sinks a current level that meets or exceeds a minimum current level. The minimum current level may be established based on a minimum load current, a minimum load impedance, or a minimum load resistance that materially affects a counter-torque generated during power generation of the turbogenerator 12. If the there is a material electrical load present for the turbogenerator 12, the method continues with step S602. However, if there is not a material electrical load present, the method continues with step S604.

In step S602, a turbogenerator controller 14 or current regulator 16 manages a speed of a shaft or the rotor associated with the turbogenerator 12 through a current loop control procedure. For example, the turbogenerator controller 14 or current regulator 16 may incorporate step S304 of FIG. 3 and FIG. 5.

In step S604, a turbogenerator controller 14 or engine controller 34 manages a speed of the shaft or rotor associated with the turbogenerator 12 (e.g., or the primary generator 13) through control of at least one of a fuel system associated with the internal combustion engine 46 and the waste gate 18 associated with (e.g., piped in parallel with) a turbine 10 of the turbogenerator 12. Step S604 may be executed in accordance with various techniques that may be applied alternately or cumulatively. Under a first technique, a waste gate 18 may be opened or opened to a greater extent to reduce the speed of the shaft or rotor of the turbogenerator 12 and closed or reduced to increase the speed of the shaft or rotor of the turbogenerator 12. Accordingly, such control of the speed of the shaft or rotor via the waste gate 18 or fuel delivery system may prevent catastrophic damage to the turbine 10, the turbine blades, or the turbogenerator 12. Further, such control may prevent the turbine 10, the turbine blades, or the turbogenerator 12 from exceeding a maximum desired speed or a desired thermal operational range of the turbine 10, the turbine blades, or the primary generator 13 or the turbogenerator 12.

Under a second technique, as an alternative to controlling the waste gate 18, or cumulative therewith, the engine controller 34 may reduce the input of fuel to the internal combustion engine 46 to reduce a speed of a rotor or shaft of a turbogenerator 12 to prevent excessive speed of the rotor or shaft or thermal damage to turbogenerator 12. Further, the engine controller 34 may increase the input of fuel to the internal combustion engine 46 to increase speed of a rotor or shaft of the turbogenerator 12 in a controlled or disciplined manner to prevent excessive speed of a rotor or shaft or thermal damage to the turbogenerator 12.

Under a third technique, the a waste gate 18 may be opened or opened to a greater extent to reduce the speed of the shaft or rotor of the turbogenerator 12 such that the speed does not exceed the upper threshold speed.

Under a fourth technique, the engine controller 34 may reduce the input of fuel to the internal combustion engine 46 to reduce a speed of a rotor or shaft of a turbogenerator 12 such that the speed does not exceed the upper threshold speed.

Having described the preferred embodiment, it will become apparent that various modifications can be made without departing from the scope of the invention as defined in the accompanying claims.

The invention claimed is:

1. A method for electrical power regulation of a turbogenerator and a generator associated with an internal combustion engine, the method comprising:
    establishing a lower threshold and an upper threshold for a speed of a rotor or shaft of a turbogenerator;
    detecting speed data or a speed signal for a rotor or shaft associated with a turbogenerator;
    controlling an output current of the turbogenerator based on the detected speed data or speed signal to control a rotational speed of the rotor or the shaft;
    establishing a lower voltage limit and an upper voltage limit for a generator;
    detecting an output voltage level associated with the generator; and
    controlling the output voltage level of the generator electrical output based on the detected output voltage level to maintain a desired operational voltage range.

2. The method according to claim 1 wherein the controlling comprises increasing the current output of the turbogenerator to a higher current level if the detected speed data or speed signal exceeds an upper threshold.

3. The method according to claim 1 wherein the controlling comprises decreasing the current output of the turbogenerator to a lower current level if the detected speed data or speed signal falls below a lower threshold.

4. The method according to claim 1 wherein the controlling comprises increasing the motor duty cycle or propulsion duty cycle of the generator if the detected output voltage level exceeds an upper voltage limit.

5. The method according to claim 1 wherein the controlling comprises increasing the generator duty cycle of the generator if the detected output voltage level falls below a lower voltage limit.

6. The method according to claim 1 further comprising: supplying the controlled output current of the turbogenerator to a load associated with at least one of a direct current bus and an alternating current bus.

7. The method according to claim 1 further comprising: supplying the controlled output voltage level to a load associated with at least one of a direct current bus and an alternating current bus.

8. The method according to claim 1 further comprising: supplying the controlled output current of the turbogenerator to the generator in a propulsion mode.

9. The method according to claim 8 further comprising: decoupling an internal combustion engine from an output shaft in the propulsion mode and coupling the generator to the output shaft in the propulsion mode.

10. The method according to claim 1 wherein the detecting of the speed comprises measuring a back electromotive force induced in one or more windings of the turbogenerator to estimate a rotational speed associated with a shaft or turbine of the turbogenerator.

11. The method according to claim 1 further comprising managing the speed of the rotor or the shaft associated with the turbogenerator through control of at least one of a fuel system associated with the internal combustion engine and a waste gate associated with a turbine of the turbogenerator such that the speed does not exceed the upper threshold.

12. A system for electrical power regulation of a turbogenerator and a generator associated with an internal combustion engine, the system comprising:
 a speed monitor for establishing a lower threshold and an upper threshold for a speed of a rotor or shaft of a turbogenerator;
 a speed detector for detecting speed data or a speed signal for a rotor or shaft associated with a turbogenerator;
 a turbogenerator controller for controlling an output current of the turbogenerator based on the detected speed data or speed signal to control a rotational speed of the rotor or the shaft;
 a voltage monitor for establishing a lower voltage limit and an upper voltage limit for a generator;
 a voltage detector for detecting an output voltage level associated with the generator; and
 a motor/generator controller for controlling the output voltage level of the generator electrical output based on the detected output voltage level to maintain a desired operational voltage range.

13. The system according to claim 12 wherein the turbogenerator controller increases the current output to a higher current level of the turbogenerator if the detected speed data or speed signal exceeds an upper threshold.

14. The system according to claim 12 wherein the turbogenerator controller decreases the current output of the turbogenerator to a lower current level if the detected speed data or speed signal falls below a lower threshold.

15. The system according to claim 12 wherein the motor/generator controller increases the motor propulsion duty cycle of the generator if the detected output voltage level exceeds an upper voltage limit.

16. The system according to claim 12 wherein the motor/generator controller increases the generator duty cycle of the generator if the detected output voltage level falls below a lower voltage limit.

17. The system according to claim 12 further comprising:
 an output bus for receiving the controlled output current of the turbogenerator and providing the controlled output current to a load.

18. The system according to claim 12 further comprising:
 an output bus for receiving the controlled output voltage level and providing the controlled output voltage level to the load.

19. The system according to claim 12 further comprising:
 an output bus for receiving the controlled output voltage level and providing the controlled output voltage level to the generator in a propulsion mode.

20. The system according to claim 19 further comprising:
 a transmission for decoupling an internal combustion engine from an output shaft in the propulsion mode and coupling the generator to the output shaft in the propulsion mode.

21. The system according to claim 12 wherein the speed detector comprises a device for measuring a back electromotive force induced in one or more windings of the turbogenerator to estimate a rotational speed associated with a shaft or turbine of the turbogenerator.

22. The system according to claim 12 further comprising:
 a waste gate associated with a turbine of the turbogenerator;
 a turbogenerator controller for managing the speed of the rotor or the shaft associated with the turbogenerator through control of the waste gate such that the speed does not exceed the upper threshold speed.

23. The system according to claim 12 further comprising:
 a fuel system associated with the internal combustion engine;
 a turbogenerator controller for managing the speed of the rotor or the shaft associated with the turbogenerator through control of the fuel system such that the speed does not exceed the upper threshold speed.

* * * * *